United States Patent
Dikhale et al.

(10) Patent No.: US 12,087,012 B2
(45) Date of Patent: *Sep. 10, 2024

(54) SYSTEMS AND METHODS FOR VISUO-TACTILE OBJECT POSE ESTIMATION

(71) Applicant: Honda Motor Co., Ltd., Tokyo (JP)

(72) Inventors: Snehal Dikhale, San Jose, CA (US); Karankumar Patel, San Jose, CA (US); Daksh Dhingra, Seattle, WA (US); Soshi Iba, Mountain View, CA (US); Nawid Jamali, Dublin, CA (US)

(73) Assignee: HONDA MOTOR CO., LTD., Tokyo (JP)

( * ) Notice: Subject to any disclaimer, the term of this patent is extended or adjusted under 35 U.S.C. 154(b) by 420 days.

This patent is subject to a terminal disclaimer.

(21) Appl. No.: 17/372,869

(22) Filed: Jul. 12, 2021

(65) Prior Publication Data

US 2022/0084241 A1 Mar. 17, 2022

Related U.S. Application Data

(63) Continuation-in-part of application No. 17/024,647, filed on Sep. 17, 2020.
(Continued)

(51) Int. Cl.
*G06T 7/73* (2017.01)
*G01S 13/86* (2006.01)
(Continued)

(52) U.S. Cl.
CPC .............. *G06T 7/74* (2017.01); *G01S 13/867* (2013.01); *G01S 17/86* (2020.01); *G06T 7/11* (2017.01);
(Continued)

(58) Field of Classification Search
CPC ......... G01S 13/867; G01S 17/86; G06T 7/74; G06T 7/70; G06T 7/11;
(Continued)

(56) References Cited

PUBLICATIONS

Cox, Rebecca E. Merging Local and Global 3D Perception for Robotic Grasping and Manipulation. Doctoral dissertation, University of Colorado at Boulder, 2017. (Year: 2017).*

(Continued)

*Primary Examiner* — Vu Le
*Assistant Examiner* — Tracy Mangialaschi
(74) *Attorney, Agent, or Firm* — RANKIN, HILL & CLARK LLP (57) ABSTRACT

Systems and methods for visuo-tactile object pose estimation are provided. In one embodiment, a computer implemented method includes receiving image data, depth data, and tactile data about the object in the environment. The computer implemented method also includes generating a visual estimate of the object that includes an object point cloud. The computer implemented method further includes generating a tactile estimate of the object that includes a surface point cloud based on the tactile data. The computer implemented method yet further includes estimating a pose of the object based on the visual estimate and the tactile estimate by fusing the object point cloud and the surface point cloud in a 3D space. The pose is a six-dimensional pose.

20 Claims, 8 Drawing Sheets

Related U.S. Application Data (60) Provisional application No. 63/154,389, filed on Feb. 26, 2021.

(51) Int. Cl.
*G01S 17/86* (2020.01)
*G06T 7/11* (2017.01)

(52) U.S. Cl.
CPC .............. *G06T 2207/10024* (2013.01); *G06T 2207/10028* (2013.01); *G06T 2207/20084* (2013.01); *G06T 2207/20221* (2013.01)

(58) Field of Classification Search
CPC . G06T 2207/10024; G06T 2207/20084; G06T 2207/10028; G06T 2207/20221; B25J 9/1694; B25J 13/084; B25J 19/023; G05B 2219/37555; G05B 2219/39528; G05B 2219/40625; G05B 2219/40575
See application file for complete search history.

(56) References Cited

PUBLICATIONS

Wang, Chen, et al. "DenseFusion: 6D Object Pose Estimation by Iterative Dense Fusion." 2019 IEEE/CVF Conference on Computer Vision and Pattern Recognition (CVPR). IEEE, 2019. (Year: 2019).*
Calandra, Roberto, et al. "More than a feeling: Learning to grasp and regrasp using vision and touch." IEEE Robotics and Automation Letters 3.4 (2018): 3300-3307. (Year: 2018).*
Nock, Charles A., et al. "Assessing the potential of low-cost 3D cameras for the rapid measurement of plant woody structure." Sensors 13.12 (2013): 16216-16233. (Year: 2013).
Office Action of U.S. Appl. No. 17/024,647 dated Aug. 18, 2023, 16 pages.
Bimbo, Joao, et al. "Object pose estimation and tracking by fusing visual and tactile information." 2012 IEEE International Conference on Multisensor Fusion and Integration for Intelligent Systems (MFI). IEEE, 2012. (Year: 2012).
Gkanatsios N, Chalvatzaki G, Maragos P, Peters J. Orientation attentive robot grasp synthesis. arXiv preprint arXiv:2006.05123. Jun. 9, 2020. (Year: 2020).
Lee MA, Zhu Y, Zachares P, Tan M, Srinivasan K, Savarese S, Fei-Fei L, Garg A, Bohg J. Making sense of vision and touch: Learning multimodal representations for contact-rich tasks. IEEE Transactions on Robotics. Jun. 4, 2020;36(3):582-96. (Year: 2020).
A. Aggarwal and F. Kirchner, "Object Recognition and Localization: The Role of Tactile Sensors," Sensors, 14(2):3227-3266, 2014.
M. Bauza, E. Valls, B. Lim, T. Sechopoulos, and A. Rodriguez, "Tactile Object Pose Estimation from the First Touch with Geometric Contact Rendering," 2020.
J. Bimbo, S. Luo, K. Althoefer, and H. Liu, "In-hand Object Pose Estimation using Covariance-Based Tactile to Geometry Matching," IEEE Robotics and Automation Letters, 1(1):570-577, 2016.
J. Bimbo, S. Rodriguez-Jimenez, H. Liu, X. Song, N. Burrus, L. D. Senerivatne, M. Abderrahim, and K. Althoefer, "Object Pose Estimation and Tracking by Fusing Visual and Tactile Information," Tech. Rep., 2012.
B. Calli, A. Singh, A. Walsman, S. Srinivasa, P. Abbeel, and A. M. Dollar, "The YCB object and Model set: Towards common benchmarks for manipulation research," in International Conference on Advanced Robotics, (ICAR), 2015.
C. Fox, M. Evans, M. Pearson, and T. Prescott, "Tactile SLAM with a Biomimetic Whiskered Robot," in IEEE International Conference on Robotics and Automation (ICRA), pp. 4925-4930, 2012.
S. Hinterstoisser, V. Lepetit, S. Ilic, S. Holzer, G. Bradski, K. Konolige, and N. Navab, "Model Based Training, Detection and Pose Estimation of Texture-Less 3D Objects in Heavily Cluttered Scenes," in Asian Conference on Computer Vision (ACCV), 2012.
M. K. Johnson and E. H. Adelson, "Retrographic Sensing for the Measurement of Surface Texture and Shape," in IEEE Conference on Computer Vision and Pattern Recognition (CVPR), 2009.
S. Luo, J. Bimbo, R. Dahiya, and H. Liu, "Robotic Tactile Perception of Object Properties: A Review," Mechatronics, 48:54-67, 2017.
J. Mahler, J. Liang, S. Niyaz, M. Laskey, R. Doan, X. Liu, J. Aparicio Ojea, and K. Goldberg, "Dex-Net 2.0: Deep Learning to Plan Robust Grasps with Synthetic Point Clouds and Analytic Grasp Metrics," in Robotics: Science and Systems (RSS), 2017.
T. To, J. Tremblay, D. Mckay, Y. Yamaguchi, K. Leung, A. Balanon, J. Cheng, W. Hodge, and S. Birchfield, "NDDS: NVIDIA Deep Learning Dataset Synthesizer," 2018.
J. Tremblay, T. To, B. Sundaralingam, Y. Xiang, D. Fox, and S. Birchfield, "Deep Object Pose Estimation for Semantic Robotic Grasping of Household Objects," in Conference on Robot Learning (CoRL), 2018.
J. Varley, C. DeChant, A. Richardson, J. Ruales, and P. Allen, "Shape Completion Enabled Robotic Grasping," in IEEE International Conference on Intelligent Robots and Systems (IROS), pp. 2442-2447, 2017.
A. S. Vazquez, R. Fernandez, A. Lopez, E. Valero, I. Payo, and A. Adan, "In-Hand Object Localization: Simple vs. Complex Tactile Sensors," In Sensors, 2014 IEEE, pp. 1710-1713, 2014.
C. Wang, D. Xu, Y. Zhu, R. Martin-Martin, C. Lu, L. Fei-Fei, and S. Savarese, "DenseFusion: 6D Object Pose Estimation by Iterative Dense Fusion," in Computer Vision and Pattern Recognition (CVPR), 2019.
T. Wang, C. Yang, F. Kirchner, P. Du, F. Sun, and B. Fang, "Multimodal Grasp Data Set: A Novel visual-tactile Data Set for Robotic Manipulation," International Journal of Advanced Robotic Systems, 2019.
D. Watkins-Valls, J. Varley, and P. Allen, "Multi-Modal Geometric Learning for Grasping and Manipulation," in IEEE International Conference on Robotics and Automation (ICRA), pp. 7339-7345, 2019.
N. Wettels, J. A. Fishel, and G. E. Loeb, "Multimodal Tactile Sensor," in The Human Hand as an Inspiration for Robot Hand Development, 2014.
Y. Xiang, T. Schmidt, V. Narayanan, and D. Fox, "PoseCNN: A Convolutional Neural Network for 6D Object Pose Estimation in Cluttered Scenes," in Robotics: Science and Systems (RSS), 2018.
A. Yamaguchi and C. G. Atkeson, "Recent progress in tactile sensing and sensors for robotic manipulation: can we turn tactile sensing into vision?" Advanced Robotics, 2019.
Office Action of U.S. Appl. No. 17/024,647 dated Mar. 3, 2023, 20 pages.
Notice of Allowance of U.S. Appl. No. 17/024,647 dated Dec. 12, 2023, 10 pages.

* cited by examiner

302 — Receive image data about an object in an environment

304 — Receive depth data about the object

306 — Receive tactile data about the object

308 — Generate a visual estimate of the object based on the image data and the depth data 310 — Generate a tactile estimate of the object based on the tactile data 312 — Estimate a pose of the object based on the visual estimate and the tactile estimate

SYSTEMS AND METHODS FOR VISUO-TACTILE OBJECT POSE ESTIMATION

BACKGROUND

Manipulation of objects is one of the remaining key challenges of robotics. In recent years, tremendous progress has been made in the area of data-driven grasp synthesis. Given an object, the goal is to infer a suitable grasp that adheres certain properties, e.g. stability or functionality. In many cases, this grasp is then performed in an open loop manner without taking any feedback into account. Furthermore, once the object is grasped, the grasp devices may occlude the object such that image data of the object is not received for at least a portion of the object. This approach can lead to a very poor success rate especially in the presence of noisy and incomplete sensor data, inaccurate models, or in a dynamic environment.

BRIEF DESCRIPTION

According to one embodiment, a system for visuo-tactile object pose estimation is provided. The system includes a sensor module, a visual module, a tactile module, and a pose module implemented with a processor. The sensor module is configured to receive image data about an object in an environment, receive depth data about the object in the environment, and receive tactile data about the object in the environment. The visual module is configured to generate a visual estimate of the object based on the image data and the depth data. The visual estimate includes an object point cloud. The tactile module is configured to generate a tactile estimate of the object based on the tactile data and the depth data. The tactile estimate includes a surface point cloud. The pose module is configured to estimate a pose of the object based on the visual estimate and the tactile estimate by combining the object point cloud and the surface point cloud in a 3D space. The pose is a six-dimensional pose including a location and an orientation of the object in the 3D space.

According to another embodiment, a computer implemented method for visuo-tactile object pose estimation is provided. The computer implemented method includes receiving image data about an object in an environment. The computer implemented method includes receiving depth data about the object. The computer implemented method includes generating a visual estimate of the object that includes an object point cloud based on the image data and the depth data. The computer implemented method also includes generating a tactile estimate of the object includes a surface point cloud based on the tactile data. The method further includes estimating a pose of the object based on the visual estimate and the tactile estimate by fusing the object point cloud and the surface point cloud in a 3D space. The pose is a six-dimensional pose including a location and an orientation of the object in the 3D space.

According to yet another embodiment, a non-transitory computer readable storage medium storing instructions that, when executed by a computer having a processor, cause the computer to perform a method for visuo-tactile object pose estimation. The computer implemented method includes receiving image data about an object in an environment. The computer implemented method includes receiving depth data about the object. The computer implemented method also includes performing semantic object segmentation based on the image data to segment the object. The computer implemented method further includes masking the depth data using the semantic object segmentation. The computer implemented method yet further includes converting the masked depth data into a three-dimensional (3D) point cloud. The computer implemented method includes generating a visual estimate of the object that includes the 3D point cloud based on the image data and the depth data. The computer implemented method also includes generating a tactile estimate of the object includes a surface point cloud based on the tactile data. The method further includes estimating a pose of the object based on the visual estimate and the tactile estimate by fusing the object point cloud and the surface point cloud in a 3D space. The pose is a six-dimensional pose including a location and an orientation of the object in the 3D space.

DETAILED DESCRIPTION

Existing pose estimation is divided to three main categories: geometry matching, probabilistic methods, and machine learning methods. Geometric methods use tactile-geometric-shape coherence descriptors to estimate the pose of the object. These techniques are fast to implement, however, they suffer from slow run-time performance. Probabilistic methods use computational algorithms, such as particle filters, Simultaneous Localization and Mapping (SLAM), and Monte Carlo methods, to estimate object poses. The probabilistic methods require excessive contacts with the object and also suffer from slow run-time performance. Machine learning methods have fast run-time performance but are reliant on visual information and do not use tactile information. Furthermore, the machine learning methods are directed to determining the shape of an object.

Here, the systems and methods estimate the pose of an object. The pose of an object defines the object by its location in a three-dimensional space. For example, in a Cartesian coordinate system, the object may be defined by a series of point or boundaries in x, y, and z planes. The pose may also include pitch, roll, and yaw to define how the object moves and interacts in the environment. Accordingly, the pose may be identified in six dimensions. Estimation of six-dimensional (6D) pose includes three dimensional (3D)

rotation and 3D translation of an object which are associated with orientation and location respectively. A 6D pose can be used in tasks like planning, manipulation, grasping, and virtual reality applications.

The systems and methods described herein, image data, depth data, and tactile data regarding an object are used to estimate the pose of the object. In some embodiments, image data may be used to determine a region of interest (RoI) or type of object. For example, the image data may be provided to an object segmentation neural network to determine the RoI. The RoI may be used to remove objects that are not of interest. The image data and the depth data are used to generate a visual estimate of the object. The depth data and the tactile data are used to generate a tactile estimate of the object. The tactile estimate includes data from force sensor that may occlude image data. The pose of the object may then be estimated based on the visual estimate and the tactile estimate. Therefore, the combination of the depth data and the tactile data can be used to improve the pose estimation accuracy even when a portion of the object is occluded.

The network for estimating an object's pose is divided into two channels, a visual-channel and a tactile-channel, to allow fusion of heterogeneous sensor data such as vision and tactile. In the visual channel, features from the color image and the point cloud from the depth image are fused at a pixel level to generate an object point cloud. In the tactile-channel, the point cloud features from the depth image and the features from the tactile sensors are fused at a point level. Fusing the tactile point cloud with the point cloud from the depth image generates a surface point cloud, which allows the network to account for parts occluded by the robot's grippers. Moreover, tactile data also helps capture the object's surface geometry, otherwise self-occluded by the object.

The system and method are independent of the type of tactile sensor. Tactile sensors may be less developed than image sensors, and thus, there is no standard representation format for tactile data. Instead, the representation depends on the underlying transduction method, for example, optical-based tactile sensors output RGB images. Here, to make the pose estimation invariant to tactile sensor types, the tactile data to be presented in conjunction with the depth data, for example, including a point cloud. That is, when the tactile sensors make contact with the object, the object surface in contact with the tactile sensor is estimated from the tactile sensor data and applied to the depth point cloud. The surface point cloud makes it possible to generate a tactile sensor invariant synthetic dataset for 6D pose estimation.

The object point cloud from visual estimate, including for example, camera and the RGB data, are strongly related. That is, each point in the depth point cloud is mapped to an RGB pixel to generate a visual estimate, such as an object point cloud, in a visual channel. Similarly, the depth point cloud and the tactile data are in the same space. Accordingly, the tactile data may be mapped to the depth point cloud to generate a tactile estimate, such as a surface point cloud, in a tactile channel. By fusing the object point cloud from the visual channel and the surface point cloud from the tactile channel, the surface point can be linked to the RGB images through the object point cloud. Accordingly, even occluded areas of the object can be modeled by fusing image data, depth data, and tactile data in the same space. Accordingly, a method to generate a synthetic visuo-tactile dataset suitable for in-hand object 6D pose estimation and a network architecture to fuse vision and tactile data to estimate the 6D pose of an in-hand object under heavy occlusion.

Definitions

The following includes definitions of selected terms employed herein. The definitions include various examples and/or forms of components that fall within the scope of a term and that can be used for implementation. The examples are not intended to be limiting. Furthermore, the components discussed herein, can be combined, omitted, or organized with other components or into different architectures.

"Agent" as used herein is a self-propelled machine that moves through or manipulates an environment. Exemplary agents can include, but is not limited to, robots, vehicles, or other self-propelled machines. The agent may be autonomously, semi-autonomously, or manually operated.

"Agent system," as used herein can include, but is not limited to, any automatic or manual systems that can be used to enhance the agent, propulsion, and/or safety. Exemplary systems include, but are not limited to: an electronic stability control system, an anti-lock brake system, a brake assist system, an automatic brake prefill system, a low speed follow system, a cruise control system, a collision warning system, a collision mitigation braking system, an auto cruise control system, a lane departure warning system, a blind spot indicator system, a lane keep assist system, a navigation system, a steering system, a transmission system, brake pedal systems, an electronic power steering system, visual devices (e.g., camera systems, proximity sensor systems), an electronic pretensioning system, a monitoring system, a passenger detection system, a suspension system, a seat configuration system, a cabin lighting system, an audio system, a sensory system, an interior or exterior camera system among others.

"Bus," as used herein, refers to an interconnected architecture that is operably connected to other computer components inside a computer or between computers. The bus can transfer data between the computer components. The bus can be a memory bus, a memory processor, a peripheral bus, an external bus, a crossbar switch, and/or a local bus, among others. The bus can also be a bus that interconnects components inside an agent using protocols such as Media Oriented Systems Transport (MOST), Controller Area network (CAN), Local Interconnect network (LIN), among others.

"Component," as used herein, refers to a computer-related entity (e.g., hardware, firmware, instructions in execution, combinations thereof). Computer components may include, for example, a process running on a processor, a processor, an object, an executable, a thread of execution, and a computer. A computer component(s) can reside within a process and/or thread. A computer component can be localized on one computer and/or can be distributed between multiple computers.

"Computer communication," as used herein, refers to a communication between two or more communicating devices (e.g., computer, personal digital assistant, cellular telephone, network device, vehicle, computing device, infrastructure device, roadside equipment) and can be, for example, a network transfer, a data transfer, a file transfer, an applet transfer, an email, a hypertext transfer protocol (HTTP) transfer, and so on. A computer communication can occur across any type of wired or wireless system and/or network having any type of configuration, for example, a local area network (LAN), a personal area network (PAN), a wireless personal area network (WPAN), a wireless network (WAN), a wide area network (WAN), a metropolitan area network (MAN), a virtual private network (VPN), a cellular network, a token ring network, a point-to-point network, an ad hoc network, a mobile ad hoc network, a vehicular ad hoc network (VANET), a vehicle-to-vehicle (V2V) network, a vehicle-to-everything (V2X) network, a vehicle-to-infrastructure (V2I) network, among others. Computer communication can utilize any type of wired, wireless, or network communication protocol including, but not limited to, Ethernet (e.g., IEEE 802.3), WiFi (e.g., IEEE 802.11), communications access for land mobiles (CALM), WiMax, Bluetooth, Zigbee, ultra-wideband (UWAB), multiple-input and multiple-output (MIMO), telecommunications and/or cellular network communication (e.g., SMS, MMS, 3G, 4G, LTE, 5G, GSM, CDMA, WAVE), satellite, dedicated short range communication (DSRC), among others.

"Communication interface" as used herein can include input and/or output devices for receiving input and/or devices for outputting data. The input and/or output can be for controlling different agent features, which include various agent components, systems, and subsystems. Specifically, the term "input device" includes, but is not limited to: keyboard, microphones, pointing and selection devices, cameras, imaging devices, video cards, displays, push buttons, rotary knobs, and the like. The term "input device" additionally includes graphical input controls that take place within a user interface which can be displayed by various types of mechanisms such as software and hardware-based controls, interfaces, touch screens, touch pads or plug and play devices. An "output device" includes, but is not limited to, display devices, and other devices for outputting information and functions.

"Computer-readable medium," as used herein, refers to a non-transitory medium that stores instructions and/or data. A computer-readable medium can take forms, including, but not limited to, non-volatile media, and volatile media. Non-volatile media can include, for example, optical disks, magnetic disks, and so on. Volatile media can include, for example, semiconductor memories, dynamic memory, and so on. Common forms of a computer-readable medium can include, but are not limited to, a floppy disk, a flexible disk, a hard disk, a magnetic tape, other magnetic medium, an ASIC, a CD, other optical medium, a RAM, a ROM, a memory chip or card, a memory stick, and other media from which a computer, a processor or other electronic device can read.

"Database," as used herein, is used to refer to a table. In other examples, "database" can be used to refer to a set of tables. In still other examples, "database" can refer to a set of data stores and methods for accessing and/or manipulating those data stores. In one embodiment, a database can be stored, for example, at a disk, data store, and/or a memory. A database may be stored locally or remotely and accessed via a network.

"Data store," as used herein can be, for example, a magnetic disk drive, a solid-state disk drive, a floppy disk drive, a tape drive, a Zip drive, a flash memory card, and/or a memory stick. Furthermore, the disk can be a CD-ROM (compact disk ROM), a CD recordable drive (CD-R drive), a CD rewritable drive (CD-RW drive), and/or a digital video ROM drive (DVD ROM). The disk can store an operating system that controls or allocates resources of a computing device.

"Display," as used herein can include, but is not limited to, LED display panels, LCD display panels, CRT display, touch screen displays, among others, that often display information. The display can receive input (e.g., touch input, keyboard input, input from various other input devices, etc.) from a user. The display can be accessible through various devices, for example, though a remote system. The display may also be physically located on a portable device, mobility device, or host.

"Logic circuitry," as used herein, includes, but is not limited to, hardware, firmware, a non-transitory computer readable medium that stores instructions, instructions in execution on a machine, and/or to cause (e.g., execute) an action(s) from another logic circuitry, module, method and/or system. Logic circuitry can include and/or be a part of a processor controlled by an algorithm, a discrete logic (e.g., ASIC), an analog circuit, a digital circuit, a programmed logic device, a memory device containing instructions, and so on. Logic can include one or more gates, combinations of gates, or other circuit components. Where multiple logics are described, it can be possible to incorporate the multiple logics into one physical logic. Similarly, where a single logic is described, it can be possible to distribute that single logic between multiple physical logics.

"Memory," as used herein can include volatile memory and/or nonvolatile memory. Non-volatile memory can include, for example, ROM (read only memory), PROM (programmable read only memory), EPROM (erasable PROM), and EEPROM (electrically erasable PROM). Volatile memory can include, for example, RAM (random access memory), synchronous RAM (SRAM), dynamic RAM (DRAM), synchronous DRAM (SDRAM), double data rate SDRAM (DDRSDRAM), and direct RAM bus RAM (DR-RAM). The memory can store an operating system that controls or allocates resources of a computing device.

"Module," as used herein, includes, but is not limited to, non-transitory computer readable medium that stores instructions, instructions in execution on a machine, hardware, firmware, software in execution on a machine, and/or combinations of each to perform a function(s) or an action(s), and/or to cause a function or action from another module, method, and/or system. A module can also include logic, a software-controlled microprocessor, a discrete logic circuit, an analog circuit, a digital circuit, a programmed logic device, a memory device containing executing instructions, logic gates, a combination of gates, and/or other circuit components. Multiple modules can be combined into one module and single modules can be distributed among multiple modules.

"Operable connection," or a connection by which entities are "operably connected," is one in which signals, physical communications, and/or logical communications can be sent and/or received. An operable connection can include a wireless interface, firmware interface, a physical interface, a data interface, and/or an electrical interface.

"Portable device," as used herein, is a computing device typically having a display screen with user input (e.g., touch, keyboard) and a processor for computing. Portable devices include, but are not limited to, handheld devices, mobile devices, smart phones, laptops, tablets, e-readers, smart speakers. In some embodiments, a "portable device" could refer to a remote device that includes a processor for computing and/or a communication interface for receiving and transmitting data remotely.

"Processor," as used herein, processes signals and performs general computing and arithmetic functions. Signals processed by the processor can include digital signals, data signals, computer instructions, processor instructions, messages, a bit, a bit stream, that can be received, transmitted and/or detected. Generally, the processor can be a variety of various processors including multiple single and multicore processors and co-processors and other multiple single and multicore processor and co-processor architectures. The processor can include logic circuitry to execute actions and/or algorithms.

"Vehicle," as used herein, refers to any moving vehicle that is capable of carrying one or more users and is powered by any form of energy. The term "vehicle" includes, but is not limited to cars, trucks, vans, minivans, SUVs, motorcycles, scooters, boats, go-karts, amusement ride cars, rail transport, personal watercraft, and aircraft. In some cases, a motor vehicle includes one or more engines. Further, the term "vehicle" can refer to an electric vehicle (EV) that is capable of carrying one or more users and is powered entirely or partially by one or more electric motors powered by an electric battery. The EV can include battery electric vehicles (BEV) and plug-in hybrid electric vehicles (PHEV). The term "vehicle" can also refer to an autonomous vehicle and/or self-driving vehicle powered by any form of energy. The autonomous vehicle can carry one or more users. Further, the term "vehicle" can include vehicles that are automated or non-automated with pre-determined paths or free-moving vehicles.

I. System Overview

Figure 1:
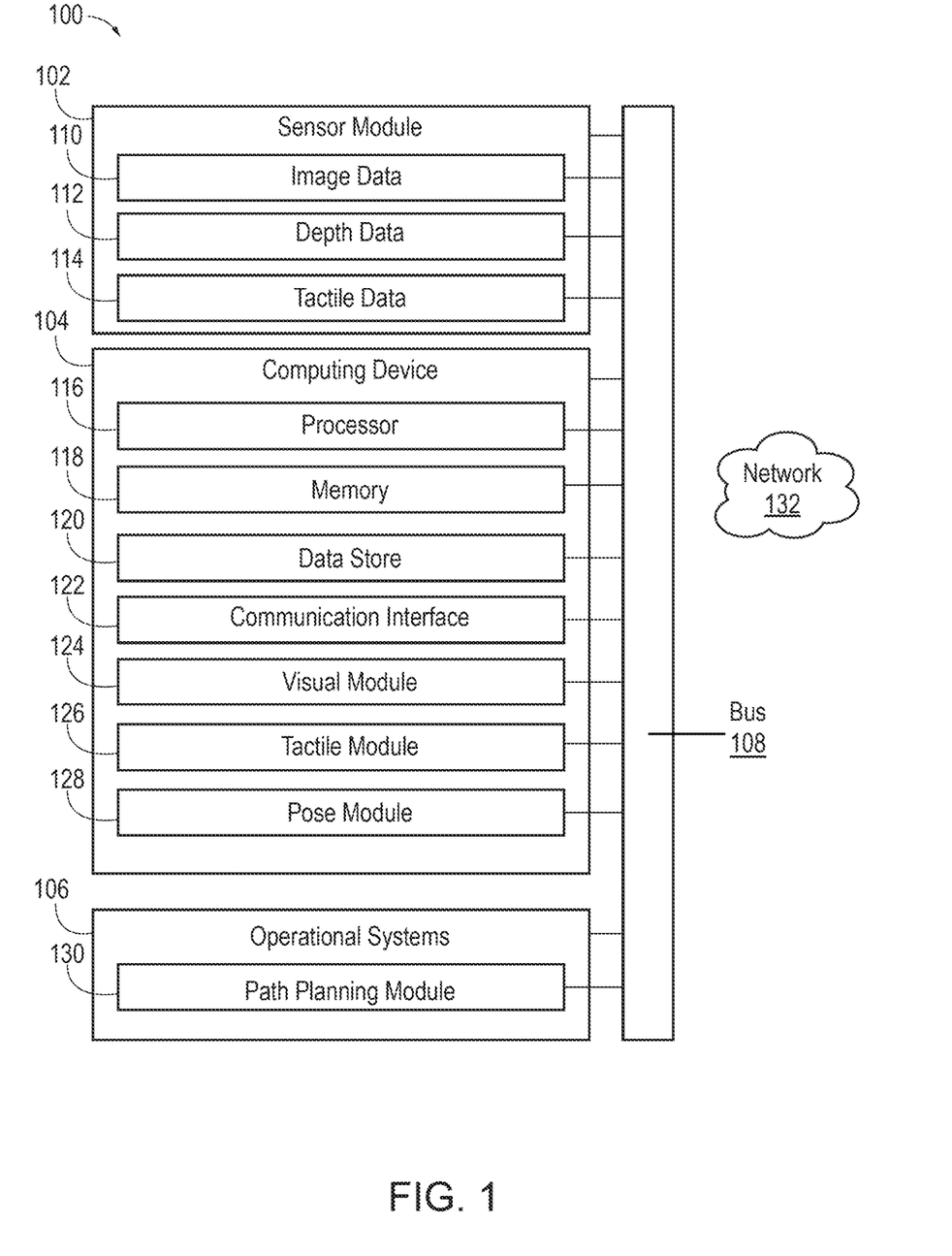
FIG. 1 is an exemplary component diagram of a system for visuo-tactile object pose estimation, according to one aspect.

Referring now to the drawings, the drawings are for purposes of illustrating one or more exemplary embodiments and not for purposes of limiting the same. FIG. 1 is an exemplary component diagram of an operating environment 100 for visuo-tactile object pose estimation, according to one aspect. The operating environment 100 includes a sensor module 102, a computing device 104, and operational systems 106 interconnected by a bus 108. The components of the operating environment 100, as well as the components of other systems, hardware architectures, and software architectures discussed herein, may be combined, omitted, or organized into different architectures for various embodiments. The computing device 104 may be implemented with a device or remotely stored.

The computing device may be implemented as a part of an agent. The agent may be bipedal, two-wheeled, four-wheeled robot, vehicle, or self-propelled machine. The autonomous ego agent may be configured as a humanoid robot. The humanoid robot may take the form of all or a portion of a robot. For example, the humanoid robot may take the form of an arm with fingers. The computing device 104 may be implemented as part of a telematics unit, a head unit, a navigation unit, an infotainment unit, an electronic control unit, among others of an agent. In other embodiments, the components and functions of the computing device 104 can be implemented, for example, with other devices 830 (e.g., a portable device) or another device connected via a network (e.g., a network 132). The computing device 104 may be capable of providing wired or wireless computer communications utilizing various protocols to send/receive electronic signals internally to/from components of the operating environment 100. Additionally, the computing device 104 may be operably connected for internal computer communication via the bus 108 (e.g., a Controller Area Network (CAN) or a Local Interconnect Network (LIN) protocol bus) to facilitate data input and output between the computing device 104 and the components of the operating environment 100.

Figure 2:
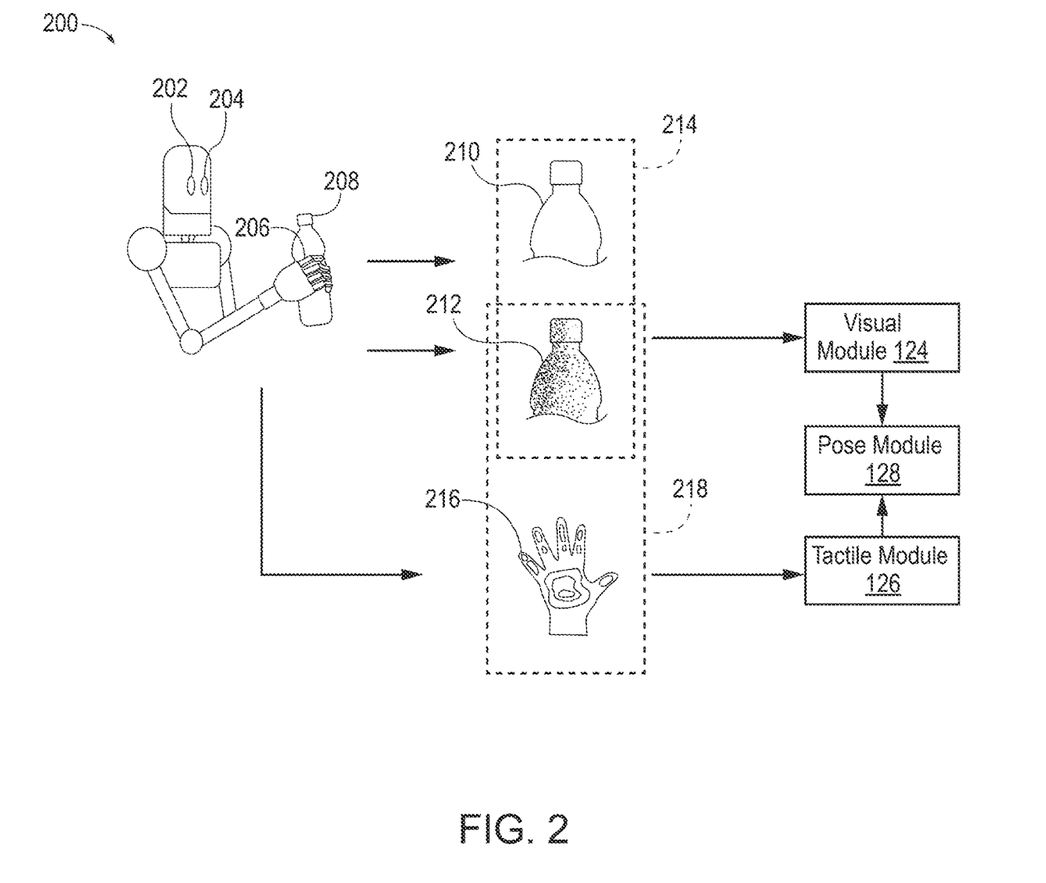
FIG. 2 is an exemplary agent environment of a system for visuo-tactile object pose estimation, according to one aspect.

In some embodiments, the ego agent may be the agent 200 shown in FIG. 2. The agent 200 has a number of sensors. For example, the agent 200 including, but not limited to, a first optical sensor 202, a second optical sensor 204, and a force sensor 206. The first optical sensor 202, the second optical sensor 204, and the force sensor 206 receive data from an environment of an object 208. The sensor module 102 receives, provides, and/or senses information associated with the agent 200, an object 208, the operating environment 100, an environment of the agent 200, and/or the operational systems 106. In one embodiment, the sensor module 102 receives image data 110, depth data 112, and tactile data 114 from the sensors. For example, the sensor module 102 may receive image data 110 from the first optical sensor 202, depth data 112 from the second optical sensor 204, and the tactile data 114 from the force sensor 206. The computing device 104 receives the image data 110, the depth data 112, and the tactile data 114 from the sensor module 102. Therefore, the image data 110, depth data 112, and tactile data 114 is raw sensor data received from their respective sensors.

Likewise, the image data 110, depth data 112, and tactile data 114 may include information about the sensors. For example, suppose the force sensor 206 is able to move. The image data 110, depth data 112, and tactile data 114 may include information about the force sensor 206 such as the relative position of the force sensor 206 to a reference point as measured by a sensor. The reference point may be the first optical sensor 202 or the second optical sensor 204. For example, the depth data 112 may include distance measurements from the second optical sensor 204 to the force sensor 206. Likewise, the tactile data 114 may include dimensions (e.g., width, height, length, etc.) of the force sensor 206.

The sensors 202-206 and/or the sensor module 102 are operable to sense a measurement of data associated with the agent 200, the operating environment 100, the object 208, the environment, and/or the operational systems 106 and generate a data signal indicating said measurement of data. These data signals can be converted into other data formats (e.g., numerical) and/or used by the sensor module 102, the computing device 104, and/or the operational systems 106 to generate other data metrics and parameters. It is understood that the sensors can be any type of sensor, for example, acoustic, electric, environmental, optical, imaging, light, pressure, force, thermal, temperature, proximity, gyroscope, and accelerometers, among others.

The computing device 104 includes a processor 116, a memory 118, a data store 120, and a communication interface 122, which are each operably connected for computer communication via a bus 108 and/or other wired and wireless technologies. The communication interface 122 provides software and hardware to facilitate data input and output between the components of the computing device 104 and other components, networks, and data sources, which will be described herein. Additionally, the computing device 104 also includes a visual module 124, a tactile module 126, and a pose module 128, for visuo-tactile object pose estimation facilitated by the components of the operating environment 100.

The visual module 124, the tactile module 126, and/or the pose module 128 may be an artificial neural network that act as a framework for machine learning, including deep learning. For example, the visual module 124, the tactile module 126, and/or the pose module 128 may be a convolution neural network (CNN). In one embodiment, the visual module 124 may be a depth CNN, the tactile module 126 may be a force CNN, and the pose module may be a pose CNN. In another embodiment, the visual module 124, the tactile module 126, and/or the pose module 128 may further include or implement concatenator, a deep neural network (DNN), a recurrent neural network (RNN), a 3D Convolutional Neural Network (3DCNN) and/or Convolutional Long-Short Term Memory (ConvLSTM). The visual module 124, the tactile module 126, and/or the pose module 128 may include an input layer, an output layer, and one or more hidden layers, which may be convolutional filters.

The computing device 104 is also operably connected for computer communication (e.g., via the bus 108 and/or the communication interface 122) to one or more operational systems 106. The operational systems 106 can include, but are not limited to, any automatic or manual systems that can be used to enhance the agent 200, operation, and/or safety. The operational systems 106 may dependent on the implementation. For example, the operational system may include a path planning module 130. The path planning module 130 monitors, analyses, operates the device to some degree. As another example, in a vehicular embodiment, the operational systems 106 may include a brake system (not shown), that monitors, analyses, and calculates braking information and facilitates features like anti-lock brake system, a brake assist system, and an automatic brake prefill system. The operational systems 106 also include and/or are operably connected for computer communication to the sensor module 102. For example, one or more sensors of the sensor module 102 may be incorporated with the path planning module 130 to monitor characteristics of the environment or the agent 200.

The sensor module 102, the computing device 104, and/or the operational systems 106 are also operatively connected for computer communication to the network 132. The network 132 is, for example, a data network, the Internet, a wide area network (WAN) or a local area (LAN) network. The network 132 serves as a communication medium to various remote devices (e.g., databases, web servers, remote servers, application servers, intermediary servers, client machines, other portable devices). Detailed embodiments describing exemplary methods using the system and network configuration discussed above will now be discussed in detail.

II. Methods for Pose Estimation

Figure 3:
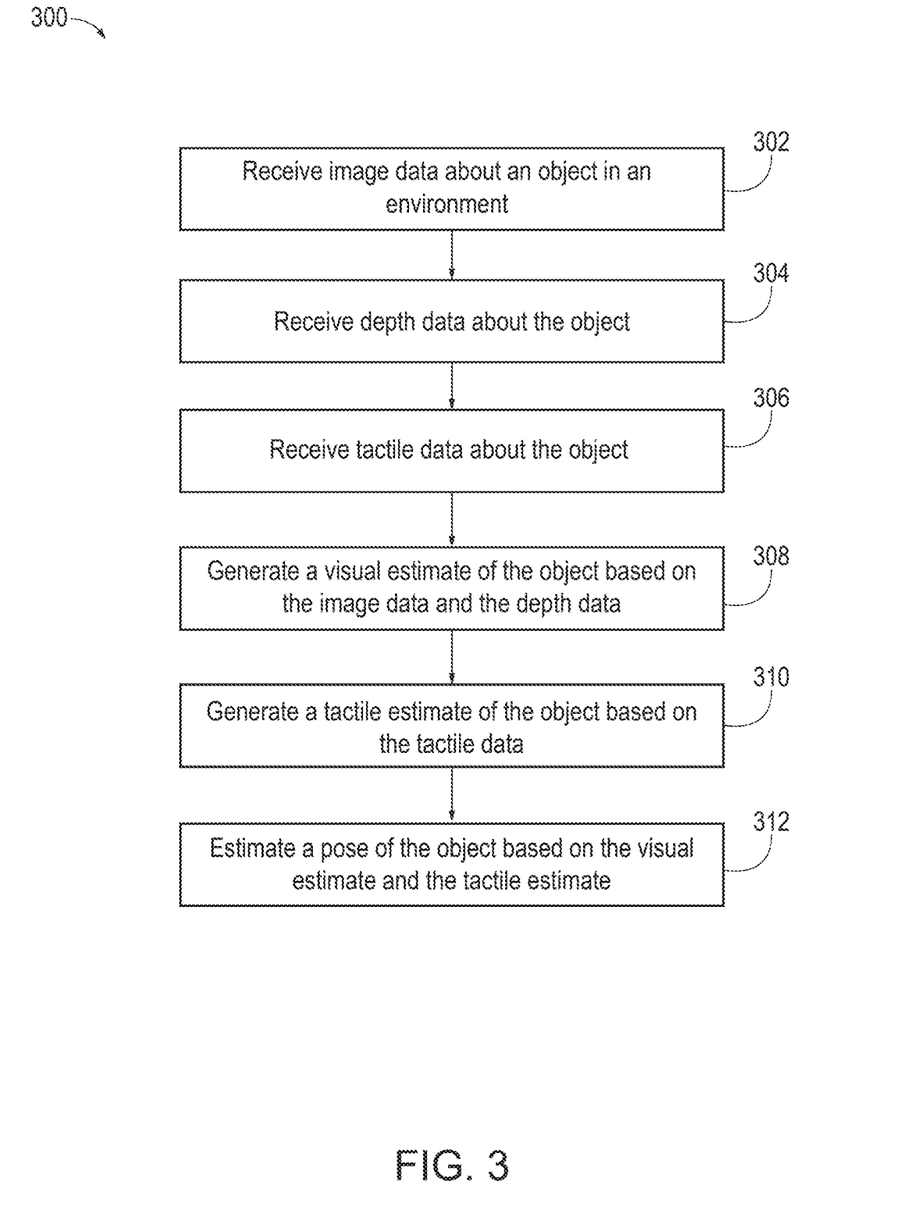
FIG. 3 is an exemplary process flow of a method for visuo-tactile object pose estimation, according to one aspect.

Referring now to FIG. 3, a method 300 for visuo-tactile object pose estimation will now be described according to an exemplary embodiment. FIG. 3 will also be described with reference to FIGS. 1, 2, 4A, 4B, and 5. For simplicity, the method 300 will be described as a sequence of elements, but it is understood that the elements of the method 300 can be organized into different architectures, blocks, stages, and/or processes.

At block 302 the method 300 includes the sensor module 102 receiving image data 110 about an object 208 in an environment. The image data 110 may be received from the first optical sensor 202. The image data 110 may include a video sequence or a series of images, user inputs, and/or data from the operational systems 106, such as data from a Controller Area Network (CAN) bus including as pedal pressure, steer angle, etc. The image data 110 may be received from the first optical sensor 202. The first optical sensor 202 may include radar units, lidar units, image capture components, sensors, cameras, scanners (e.g., 2-D scanners or 3-D scanners), or other measurement components. In some embodiments, the image data 110 is augmented as additional sensor data from other sources is received. For example, the image data 110 from the first optical sensor 202 may be augmented by other sources, such as the second optical sensor 204, and/or remote devices (e.g., via the bus 108 and/or the communication interface 122).

The image data 110 may correspond to the portion of the object 208 that is not occluded by the agent 200 or the environment. For example, as shown in FIG. 2, the agent 200 is holding an object 208, shown here as a bottle, with a force sensor 206 represented by the hand of the agent 200. Suppose the image data 110 may be image data, such as RGB data, YCB data, and/or YUV data. The image data 110 may include or be used to construct a visualized dataset 210 of the portion of the object 208 that can be assessed by the first optical sensor 202. The visualized dataset 210 may be a color image corresponding to the image data 110 visible by the first optical sensor 202. Therefore, the portion of the object 208 occluded by the force sensor 206 may not be represented in the visualized dataset 210.

At block 304 the method 300 includes the sensor module 102 receiving depth data 112 about the object 208 in the environment. The depth data 112 may be received from the second optical sensor 204. The depth data 112 may include a video sequence or a series of images, user inputs, and/or data from the operational systems 106, such as data from a Controller Area Network (CAN) bus including as pedal pressure, steer angle, etc. The depth data 112 may be received from the second optical sensor 204. The second optical sensor 204 may include radar units, lidar units, image capture components, ranging sensors, cameras, scanners (e.g., 2-D scanners or 3-D scanners), or other measurement components. In some embodiments, the depth data 112 is augmented as additional sensor data from other sources is received. For example, the depth data 112 from the second optical sensor 204 may be augmented by other sources, such as the first optical sensor 202, and/or remote devices (e.g., via the bus 108 and/or the communication interface 122).

The depth data 112 may correspond to the portion of the object 208 that is not occluded by the agent 200 or the environment. The depth data 112 contains information relating to the distance of the surfaces of the object 208 from a viewpoint, such as the agent 200 or the second optical sensor 204. For example, the depth data 112 may include the distance between the object 208 and the second optical sensor 204 as computed by the visual module 124. The depth point cloud incudes the distances as a set of data points that represent the 3D shape of the object 208. The depth data 112 may include or be used to construct a depth dataset 212 of the portion of the object 208 that can be assessed by the second optical sensor 204. Accordingly, the portion of the object 208 occluded by the force sensor 206 may not be represented in the depth dataset 212 of the object 208. In this manner, the depth dataset 212, as well as the visualized dataset 210 and the tactile dataset 216, may be constructed using the image data 110, the depth data 112, and the tactile data 114.

In another embodiment, the depth dataset 212 may include the portion of the object 208 is occluded by the force sensor 206. For example, the sensor module 102 may calculate distance from the agent 200 to the object 208 for the depth dataset 212 using distance measurements from the depth dataset 212 and dimensions of the force sensor 206 of the tactile data 114.

For clarity, the method 300 and the method 600 are described with respect to a single object 208. However, the image data 110 and the depth data 112 may be associated with one or more objects. Accordingly, the agent 200 may detect or identify one or more of the entities, objects, obstacles, hazards, and/or corresponding attributes or characteristics a position or a location associated with the object 208 as well as other objects. Likewise, the described sensors 202-206, such as the force sensor 206, may include a single sensor or an array of sensors.

Figure 4A:
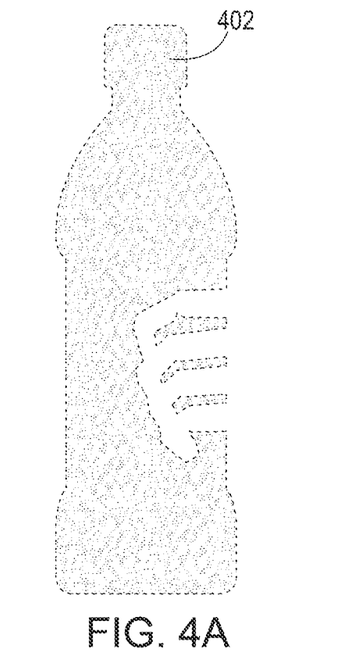
FIG. 4A includes exemplary visual estimate, according to one aspect.

Returning to FIG. 3, at block 306 the method 300 includes the visual module 124 generating a visual estimate of the object 208 based on the visual channel combined dataset 214 of the visualized dataset 210 and the depth dataset 212. Turning to FIG. 4A, in some embodiments, the visual estimate 402. The visual estimate 402 is a combination of the visualized dataset 210 and the depth dataset 212 in the visual channel combined dataset 214.

Figure 5:
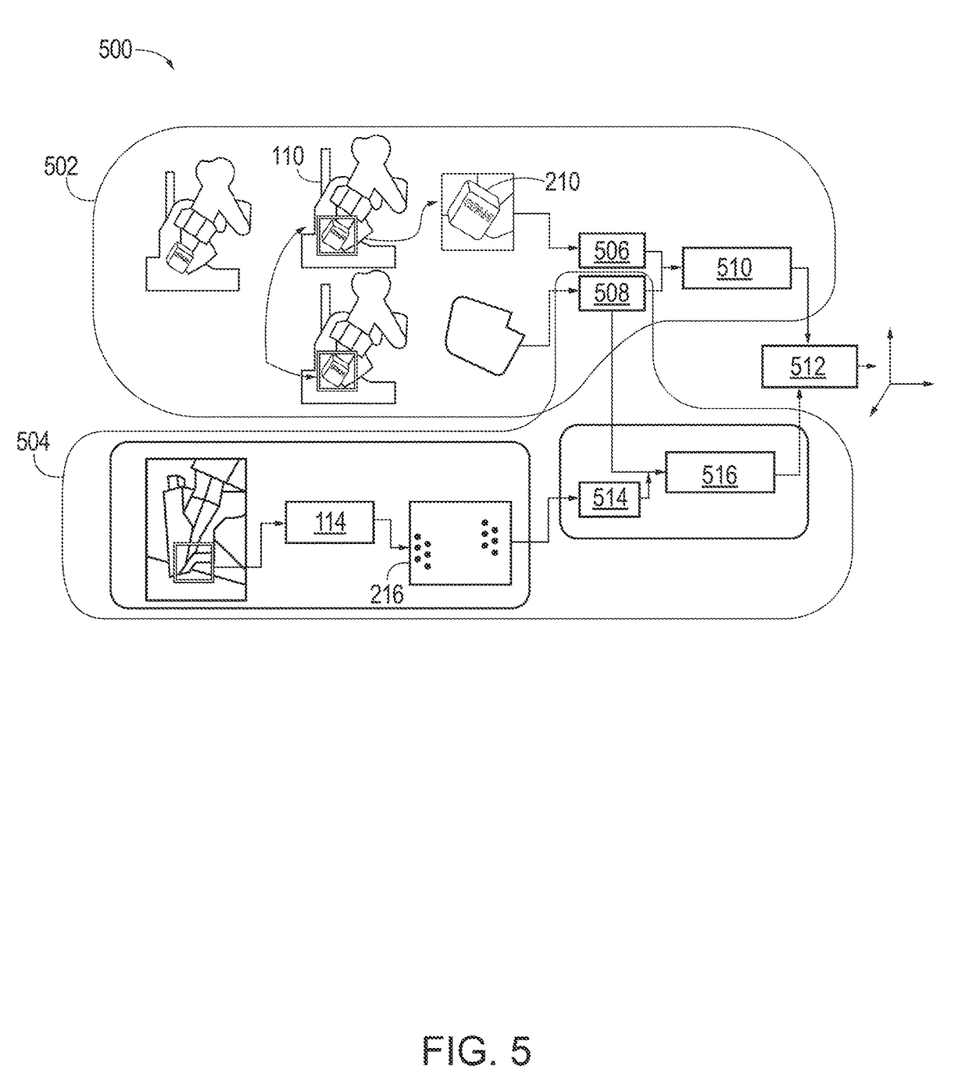
FIG. 5 is an exemplary network architecture of a system for visuo-tactile object pose estimation, according to one aspect.

In some embodiments, the visual module 124 generates the visual estimate 402 based on neural networks. Turning to FIG. 5, an exemplary network architecture 500 having a visual channel 502 and a tactile channel 504. The visual channel 502 includes a first convolutional neural network (CNN) 506 and a second CNN 508. The tactile channel 504 includes a third CNN 514.

For example, the first CNN 506 may be used to obtain the image features and reconstruct the fused image. In the visual channel 502, the image data 110 may include or be used to construct the visualized dataset 210, which is received as input by the first CNN 506. The first CNN 506 may be a color embedding CNN.

Also in the visual channel 502, the depth data 112 may include or be used to construct the depth dataset 212, which is received as input by the second CNN 508. In some embodiments, the first CNN 506 and the second CNN 508 are two-stage convolutional neural networks (CNN). Accordingly, the visualized dataset 210 and the depth dataset 212 go through the two-stage CNNs, the first CNN 506 and the second CNN 508. The second CNN 508 may be a depth embedding CNN.

The output of the first CNN 506 and the second CNN 508 are fused using a first fusion network 510 to generate the visual estimate 402. The first fusion network aligns the visualized dataset 210 and the depth dataset 212 to represent the object 208 in the visual estimate 402. In some embodiments, the first fusion network 510 is a pixel-wise dense fusion network. The first fusion network 510 determines an RoI of the object 208 to crop the visualized dataset 210 and the depth dataset 212. Suppose the visualized dataset includes RGB images, the first fusion network 510 crops the RGB images. From the cropped images, a number of pixel locations corresponding between the visualized dataset 210 and the depth dataset 212 may be extracted. The visual estimate 402 includes the extracted pixel locations. The visual estimate 402 includes an object point cloud as the visualized dataset 210 is applied to a depth point cloud of the depth dataset 212. The visual estimate 402 may be then sent to a pose neural network 512 of the pose module 128. In another embodiment, an encoding and decoding network may be used to obtain the image features.

At block 308 the method 300 includes the method 300 includes the sensor module 102 receiving tactile data 114 about the object 208. The tactile data 114 may include pressure mapping, force mapping, user inputs, and/or data from the operational systems 106, such as data from a Controller Area Network (CAN) bus including as pedal pressure, steer angle, etc. In some embodiments, the sensor module 102 may receive the tactile data 114 may include a surface estimate of the object 208 that includes shape data.

In this manner, the tactile data 114 may correspond to the portion of the object 208 that is occluded by the agent 200 or the environment. For example, the portion of the object 208 occluded by the force sensor 206 can be provided based on the tactile data 114 received from the force sensor 206. Accordingly, the tactile data 114 provides additional data about object that may not be captured by the first optical sensor 202 and the second optical sensor 204. Because the tactile data 114 is based on contact with the object 208, the tactile dataset 216 may not include information about portions of the object 208 not in contact with the agent 200. Instead, the tactile data 114 supplements the visualized dataset 210, the depth dataset 212, and/or the visual channel combined dataset 214.

The tactile data 114 may be received from the force sensor 206. The force sensor 206 may include tensile force sensors, compressions force sensors, tensile and force compression sensors, or other measurement components. The force sensor 206 may be with a Weiss gripper with GelSight tactile sensors. In some embodiments, the tactile data 114 is augmented as additional sensor data from other sources is received. For example, the tactile data 114 from the force sensor 206 may be augmented by other sources, such as additional force sensors (e.g., from a second hand of the agent 200), and/or remote devices (e.g., via the bus 108 and/or the communication interface 122).

At block 310 the method 300 includes the method 300 includes the tactile module 126 generating a tactile estimate 404 of the object 208 based on the tactile channel 504. The tactile estimate 404 includes the tactile channel combined dataset 218 including both the depth dataset 212 and the tactile dataset 216. Continuing the two-channel embodiment from above, the input to the tactile channel 504 may include, for example, a depth point cloud from the depth dataset 212 and the tactile dataset 216, which together form the tactile channel combined dataset 218. The tactile module 126 may then cause the tactile dataset 216 to go through a two stage CNN to produce tactile embeddings such that the tactile embeddings are applied to the depth point cloud to generate a tactile estimate 404 that is a surface point cloud. Thus, like the visual estimate 402, the tactile estimate 404 is a fusion of different data types based on the depth point cloud of the depth dataset 212.

Figure 4B:
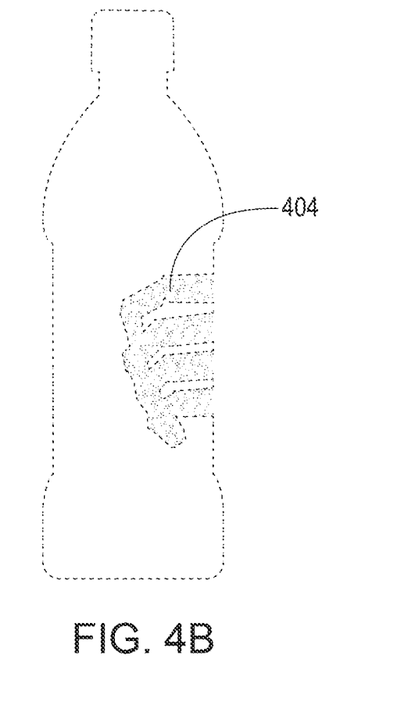
FIG. 4B includes exemplary tactile estimate, according to one aspect.

Turning to FIG. 4B, in some embodiments, the tactile estimate 404 includes a surface point cloud. For example, the tactile estimate 404 may include a number of points representing at least a portion the surface of the object 208, in contact with the force sensor 206, that represent the 3D shape of the object 208. Because the occluded portion of the object 208, hidden by the force sensor 206, is not visualized by the first optical sensor 202 or the second optical sensor 204, the tactile estimate 404 may supplement the visual estimate 402.

Turning to FIG. 5, the tactile channel 504 includes a third CNN 514. The third CNN 514 is received as input by the third CNN 514. In some embodiments, the third CNN 514 is two-stage convolutional neural networks (CNN). The output of the the third CNN 514 is fused using a second fusion network 516 to generate the tactile estimate 404.

The second fusion network 516 aligns the output of the tactile dataset 216 with the visualized dataset 210 and the output of the third CNN 514 to represent the object 208. In some embodiments, the second fusion network 516 is a point-wise fusion network. In one embodiment, the second fusion network 516 of the tactile channel 504 may select n number of random points from the tactile dataset 216 to be mapped to align with the visual estimate 402 of the depth dataset 212. The n number of random points selected may be equal to the n number of points selected in the visual channel 502. For example, Like the visual estimate 402, the tactile estimate 404 is another pose estimate of the object 208. The tactile estimate 404 may be then sent to a pose neural network 512 of the pose module 128.

At block 312 the method 300 includes the pose module 128 estimating a pose of the object based on the visual estimate and the tactile estimate. The visual estimate includes a model of a portion of the object 208 that are visualized by the agent 200 and the tactile estimate includes a model of an occluded portion of the object 208 occluded by the agent. In some embodiments, the estimation of the pose is based on the pose neural network 512. Accordingly, the visual estimate and the tactile estimate can be used in combination to estimate the pose of the object 208. In particular the object 208 may be identified in the environment based on a coordinate system as well as movement about predetermined axes. For example, the object 208 may be defined by contours in 3-dimension coordinate systems, such as x, y, and z, as well as by pitch, yaw, and roll. In this manner the pose is more than the mere shape of the object 208 because shape is merely an inherent characteristic of the object 208. Instead, the pose defines where the object 208 is in the environment as well as the orientation of the object 208.

Given the two-channel embodiment discussed with respect to the visual module 124 and the tactile module 126. The rationale behind this fusion is that, the object point cloud from the camera, as depth data 112, and the image data 110 are strongly related, for example, each point in the point cloud is mapped to an RGB pixel. Similarly, the surface point cloud of the tactile estimate 404 and the object point cloud of the visual estimate 402 are in the same space. In this manner, the surface point cloud of the tactile estimate 404 can be linked to the images through the object point cloud of the visual estimate 402. Therefore, by combining the surface point cloud that is based on the depth data 112 and the tactile data 114 with the object point cloud that is based on the depth data 112 and the image data 110, the pose module 128 can estimate the 6D pose even if a portion of the object is occluded.

Using the image data 110, the depth data 112, and the tactile data 114 to estimate the pose of the object 208 that is grasped by the agent 200 allows the agent 200 to estimate portions of the object 208 that can't be seen. Specifically, using the visual channel combined dataset 214 and the tactile channel combined dataset 218 based on the image data 110, the depth data 112, and the tactile data 114 provides a more accurate estimation than using the image data 110 alone, especially when the object 208 of interest is occluded by the agent 200. The depth data 112 acts a linkage between the image data 110 and the tactile data 114. Furthermore, using the depth data 112 and tactile data 114 eliminates the need for computationally expensive post processing algorithms, like iterative closest point algorithm (ICP) and improves accuracy for occluded portions of the object 208.

Figure 6:
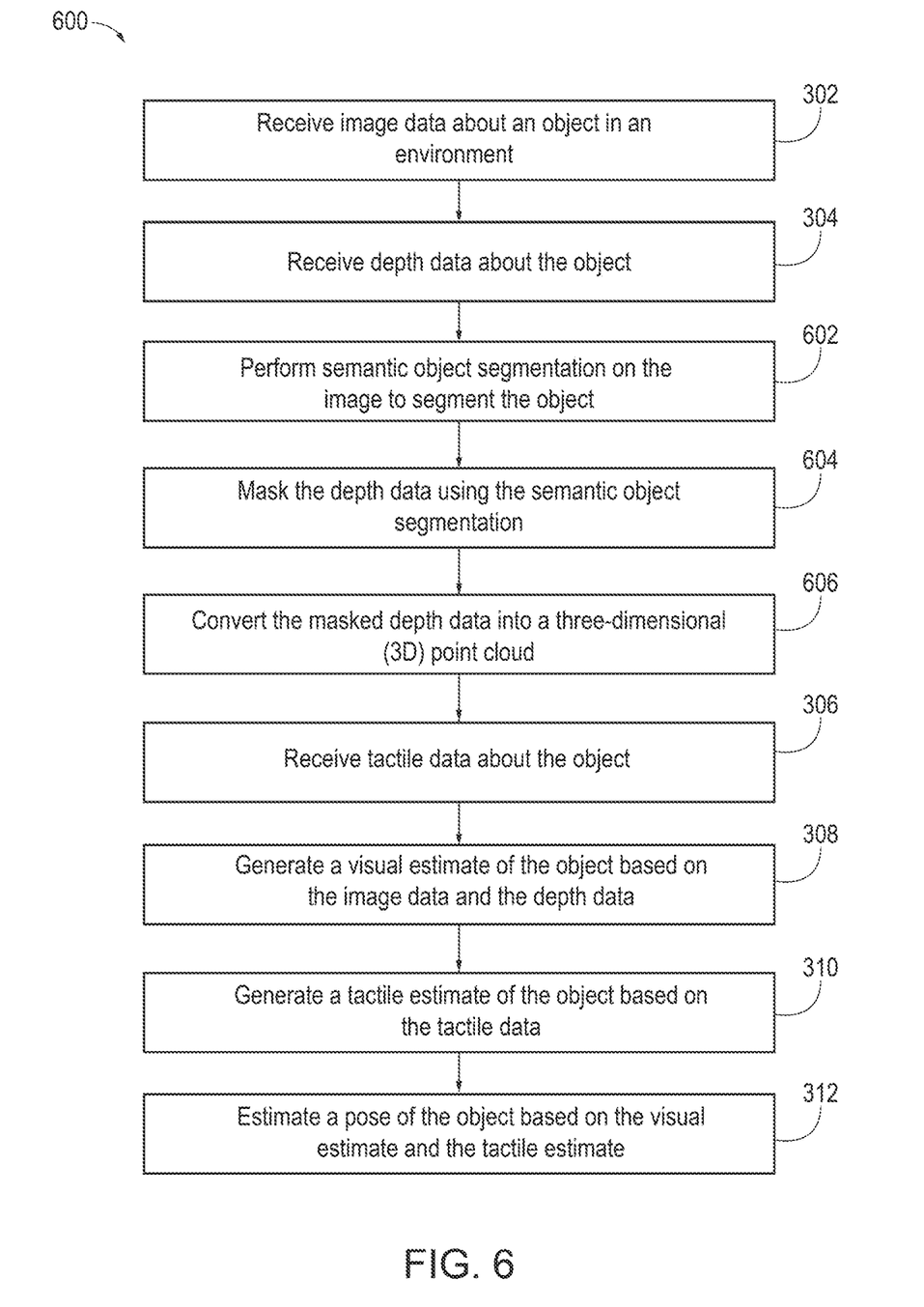
FIG. 6 is another exemplary process flow of a method for visuo-tactile object pose estimation, according to one aspect.

FIG. 6 is another exemplary process flow of a method for visuo-tactile object pose estimation, according to one aspect. FIG. 6 includes similar blocks as described above with respect to FIG. 3. Accordingly, these blocks operate in a similar manner as described above. At block 302, the method 600 includes receiving image data 110 about an object 208 in an environment. At block 304, the method 600 includes receiving depth data 112 about the object 208.

At block 602, the method 600 includes performing semantic object segmentation on the image data 110 to segment the object 208. To generate the visual estimate 402, the visual module 124 may perform semantic object segmentation on the image data 110 to segment the object 208. Semantic object segmentation is performed on the image data 110 to segment the object 208 of interest. The semantic object segmentation allows the silhouette of the object 208 to be identified from the image data 110. In one embodiment, performing semantic object segmentation includes cropping the image data 110 with a bounding box of the semantic segmentation. The cropped image is then fed into a region-based convolution neural network (R-CNN) that processes the color image and maps each pixel in the image crop to a color feature embedding.

At block 604, the method 600 includes masking the depth data 112 using the semantic object segmentation. The depth data is masked using the semantic object segmentation and converted to a 3D point cloud in a coordinate frame of the first optical sensor 202, the second optical sensor 204, etc. Since the color embedding is for the entire cropped image, the mask from the semantic segmentation is used to keep only n random embeddings and their corresponding 3D points. This ensures that the subsequent networks consider points that are on the object. For example, n may be set to 1000. The color embedding and the depth embedding, each go through a two-stage convolutional neural networks (CNN). The output of the color embedding CNN and the depth CNN are fused using pixel-wise dense fusion.

At block 606, the method 600 includes converting the masked depth data into a three-dimensional (3D) point cloud. That is, for each object pixel visible in the image data, the corresponding 3D location of the object is placed in the coordinate frame. in this manner, because the optical sensors superimpose the depth data, as the 3D point cloud with the color data.

At block 306 the method 600 includes the visual module 124 generating a visual estimate of the object 208 based on the visual channel combined dataset 214 of the visualized dataset 210 and the depth dataset 212. Here, the visual estimate 402 is the object cloud constructed from the 3D point cloud with the embedded color data from the visualized dataset 210.

At block 308 the method 600 includes the method 300 includes the sensor module 102 receiving tactile data 114 about the object 208. At block 310 the method 600 includes the method 300 includes the tactile module 126 generating a tactile estimate 404 of the object 208 based on the tactile channel 504. At block 312 the method 600 includes the pose module 128 estimating a pose of the object based on the visual estimate and the tactile estimate.

Therefore, method 600 describes the image data 110 being provided to an object 208 segmentation neural network to determine the RoI of the object 208. In some embodiments, the RoI may be used to remove extraneous objects that are not of interest to streamline data processing. The RoI may also be used to focus on a specific portion of the object 208 or classify the object 208 by type. Object classification may facilitate registering the image data 110 with the depth data 112 and/or the tactile data 114.

Figure 7:
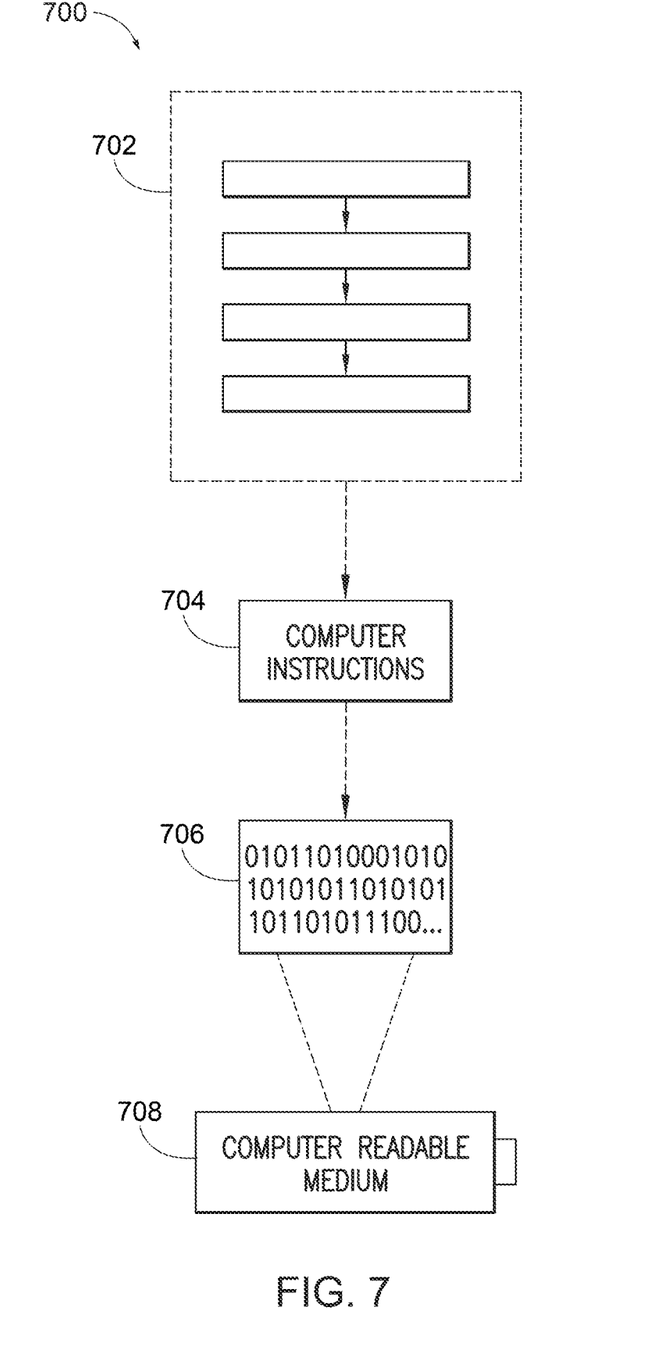
FIG. 7 is an illustration of an example computer-readable medium or computer-readable device including processor-executable instructions configured to embody one or more of the provisions set forth herein, according to one aspect.

Still another aspect involves a computer-readable medium including processor-executable instructions configured to implement one aspect of the techniques presented herein. An aspect of a computer-readable medium or a computer-readable device devised in these ways is illustrated in FIG. 7, wherein an implementation 700 includes a computer-readable medium 708, such as a CD-R, DVD-R, flash drive, a platter of a hard disk drive, etc., on which is encoded computer-readable data 706. This encoded computer-readable data 706, such as binary data including a plurality of zero's and one's as shown in 706, in turn includes a set of processor-executable computer instructions 704 configured to operate according to one or more of the principles set forth herein.

In this implementation 700, the processor-executable computer instructions 704 may be configured to perform a method 702, such as the method 300 of FIG. 3 and/or the method 600 of FIG. 6. In another aspect, the processor-executable computer instructions 704 may be configured to implement a system, such as the operating environment 100 of FIG. 1. Many such computer-readable media may be devised by those of ordinary skill in the art that are configured to operate in accordance with the techniques presented herein.

As used in this application, the terms "component", "module," "system", "interface", and the like are generally intended to refer to a computer-related entity, either hardware, a combination of hardware and software, software, or software in execution. For example, a component may be, but is not limited to being, a process running on a processor, a processing unit, an object, an executable, a thread of execution, a program, or a computer. By way of illustration, both an application running on a controller and the controller may be a component. One or more components residing within a process or thread of execution and a component may be localized on one computer or distributed between two or more computers.

Further, the claimed subject matter is implemented as a method, apparatus, or article of manufacture using standard programming or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, many modifications may be made to this configuration without departing from the scope or spirit of the claimed subject matter.

Figure 8:
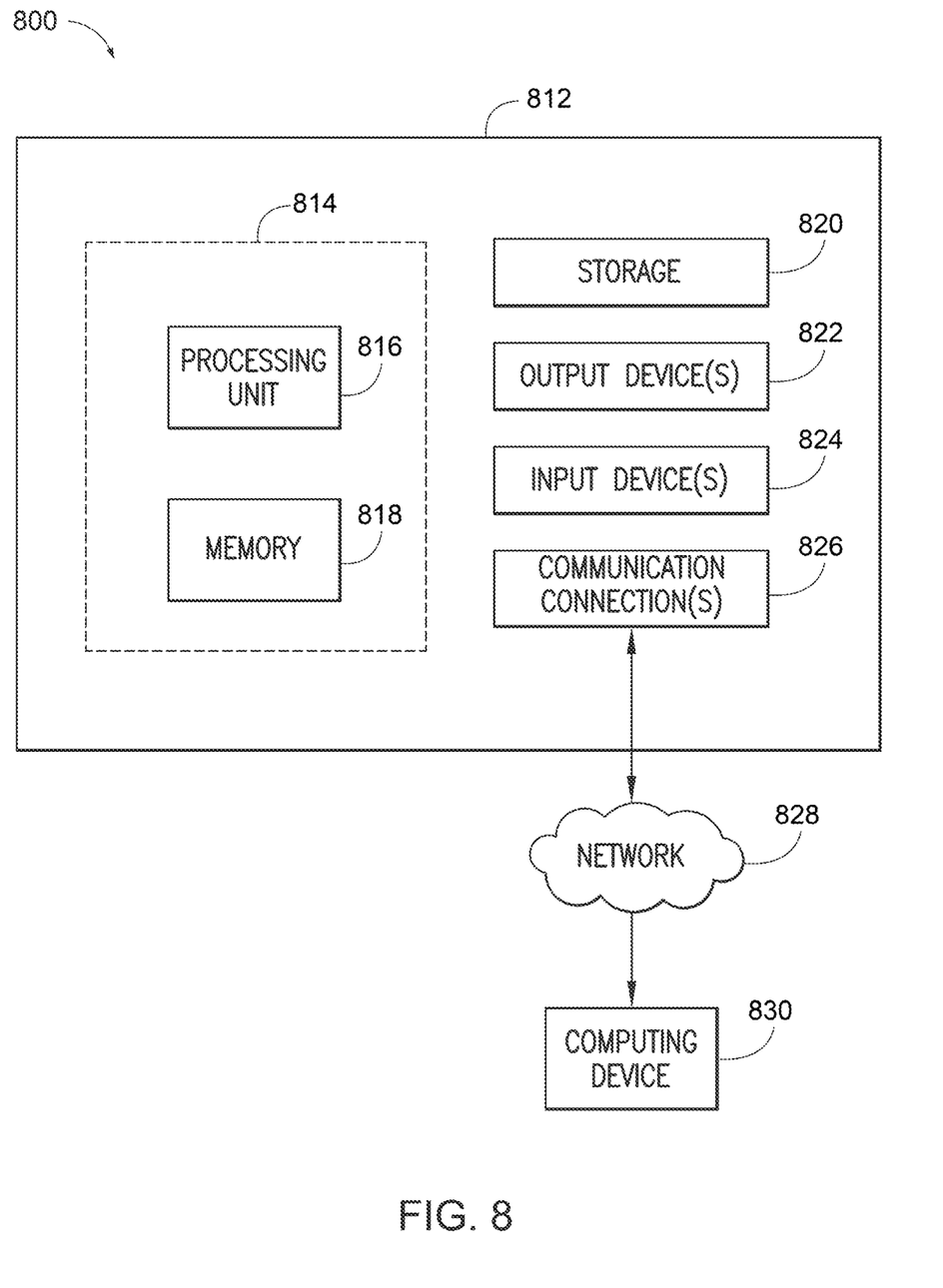
FIG. 8 is an illustration of an example computing environment where one or more of the provisions set forth herein are implemented, according to one aspect.

FIG. 8 and the following discussion provide a description of a suitable computing environment to implement aspects of one or more of the provisions set forth herein. The operating environment of FIG. 8 is merely one example of a suitable operating environment and is not intended to suggest any limitation as to the scope of use or functionality of the operating environment. Example computing devices include, but are not limited to, personal computers, server computers, hand-held or laptop devices, mobile devices, such as mobile phones, Personal Digital Assistants (PDAs), media players, and the like, multiprocessor systems, consumer electronics, mini computers, mainframe computers, distributed computing environments that include any of the above systems or devices, etc.

Generally, aspects are described in the general context of "computer readable instructions" being executed by one or more computing devices. Computer readable instructions may be distributed via computer readable media as will be discussed below. Computer readable instructions may be implemented as program modules, such as functions, objects, Application Programming Interfaces (APIs), data structures, and the like, that perform one or more tasks or implement one or more abstract data types. Typically, the functionality of the computer readable instructions are combined or distributed as desired in various environments.

FIG. 8 illustrates an exemplary network architecture 800 including an apparatus 812 configured to implement one aspect provided herein. In one configuration, the apparatus 812 includes at least one processing unit 816 and memory 818. Depending on the exact configuration and type of computing device, memory 818 may be volatile, such as RAM, non-volatile, such as ROM, flash memory, etc., or a combination of the two. This configuration is illustrated in FIG. 8 by dashed line 814.

In other aspects, the apparatus 812 includes additional features or functionality. For example, the apparatus 812 may include additional storage such as removable storage or non-removable storage, including, but not limited to, magnetic storage, optical storage, etc. Such additional storage is illustrated in FIG. 8 by storage 820. In one aspect, computer readable instructions to implement one aspect provided herein are in storage 820. Storage 820 may store other computer readable instructions to implement an operating system, an application program, etc. Computer readable instructions may be loaded in memory 818 for execution by processing unit 816, for example.

The term "computer readable media" as used herein includes computer storage media. Computer storage media includes volatile and nonvolatile, removable and non-removable media implemented in any method or technology for storage of information such as computer readable instructions or other data. Memory 818 and storage 820 are examples of computer storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which may be used to store the desired information and which may be accessed by the apparatus 812. Any such computer storage media is part of the apparatus 812.

The term "computer readable media" includes communication media. Communication media typically embodies computer readable instructions or other data in a "modulated data signal" such as a carrier wave or other transport mechanism and includes any information delivery media. The term "modulated data signal" includes a signal that has one or more of its characteristics set or changed in such a manner as to encode information in the signal.

The apparatus 812 includes input device(s) 824 such as keyboard, mouse, pen, voice input device, touch input device, infrared cameras, video input devices, or any other input device. Output device(s) 822 such as one or more displays, speakers, printers, or any other output device may be included with the apparatus 812. Input device(s) 824 and output device(s) 822 may be connected to the apparatus 812 via a wired connection, wireless connection, or any combination thereof. In one aspect, an input device or an output device from another computing device may be used as input device(s) 824 or output device(s) 822 for the apparatus 812. The apparatus 812 may include communication connection(s) 826 to facilitate communications with one or more other devices 830, such as through network 828, for example.

Although the subject matter has been described in language specific to structural features or methodological acts, it is to be understood that the subject matter of the appended claims is not necessarily limited to the specific features or acts described above. Rather, the specific features and acts described above are disclosed as example aspects. Various operations of aspects are provided herein. The order in which one or more or all of the operations are described should not be construed as to imply that these operations are necessarily order dependent. Alternative ordering will be appreciated based on this description. Further, not all operations may necessarily be present in each aspect provided herein.

As used in this application, "or" is intended to mean an inclusive "or" rather than an exclusive "or". Further, an inclusive "or" may include any combination thereof (e.g., A, B, or any combination thereof). In addition, "a" and "an" as used in this application are generally construed to mean "one or more" unless specified otherwise or clear from context to be directed to a singular form. Additionally, at least one of A and B and/or the like generally means A or B or both A and B. Further, to the extent that "includes", "having", "has", "with", or variants thereof are used in either the detailed description or the claims, such terms are intended to be inclusive in a manner similar to the term "comprising".

Further, unless specified otherwise, "first", "second", or the like are not intended to imply a temporal aspect, a spatial aspect, an ordering, etc. Rather, such terms are merely used as identifiers, names, etc. for features, elements, items, etc. For example, a first channel and a second channel generally correspond to channel A and channel B or two different or two identical channels or the same channel. Additionally, "comprising", "comprises", "including", "includes", or the like generally means comprising or including, but not limited to.

It will be appreciated that several of the above-disclosed and other features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A system for visuo-tactile object pose estimation, the system comprising at least one computing device configured to function as:
   a sensor module configured to:
      receive image data about an object in an environment, wherein the image data includes a visualized dataset of a portion of the object generated by an optical sensor;
      receive depth data about the object in the environment;
      receive tactile data about the object in the environment, wherein the tactile data includes a tactile dataset generated by a force sensor, and the force sensor occludes a portion of the object from the optical sensor when the optical sensor generates the visual dataset;
   a visual module configured to determine a region of interest (RoI) including a portion of the object that is not occluded by the force sensor when the optical sensor generates the visual dataset, and to generate a visual estimate of the portion of the object in the RoI based on the image data and the depth data, wherein the visual estimate includes an object point cloud;
   a tactile module configured to generate a tactile estimate of the object based on the tactile data and the depth data, wherein the tactile estimate includes a surface point cloud; and
   a pose module configured to estimate a pose of the object based on the visual estimate and the tactile estimate by combining the object point cloud and the surface point cloud in a 3D space, wherein the pose is a six dimensional pose.

2. The system of claim 1, wherein the visual module is further configured to:
   perform semantic object segmentation on the image data to segment the object;
   mask the depth data using the semantic object segmentation; and
   convert the masked depth data into the object point cloud.

3. The system of claim 1, wherein the image data is RGB data from the optical sensor and wherein the depth data is received from a second sensor that is a ranging sensor.

4. The system of claim 1, wherein the visual module employs a first convolutional neural network (CNN), wherein the tactile module employs a second CNN, and wherein the pose module employs a fully connected CNN layer.

5. The system of claim 1, wherein the RoI is determined using an object segmentation neural network employed by the visual module.

6. The system of claim 1, wherein the pose includes a location and an orientation of the object in the 3D space.

7. The system of claim 1, wherein the visual estimate includes a model of the portion of the object included in the RoI and the tactile estimate includes a model of the portion of the object occluded by the force sensor when the optical sensor generates the visual dataset.

8. The system of claim 1, wherein the visual module is configured to generate the visual estimate by performing semantic object segmentation on the image data by cropping the portion of the object that is not occluded by the force sensor with a bounding box, and inputting the cropped image data into a region-based convolution neural network (R-CNN) that maps each pixel in the cropped image data to a color feature embedding.

9. The system of claim 1, wherein the depth data includes a depth dataset of the object generated by a ranging sensor, and the depth dataset includes the portion of the object occluded by the force sensor when the optical sensor generates the visual dataset, wherein the sensor module calculates a distance to the object for the depth dataset using distance measurements from the depth dataset and dimensions of the force sensor of the tactile data.

10. The system of claim 1, wherein the tactile data corresponds to the portion of the object occluded by the force sensor when the optical sensor generates the visual dataset.

11. A computer implemented method for visuo-tactile object pose estimation, comprising:
   receiving image data about an object in an environment, wherein the image data includes a visualized dataset of a portion of the object generated by an optical sensor;
   receiving depth data about the object in the environment;
   receiving tactile data about the object in the environment, wherein the tactile data includes a tactile dataset generated by a force sensor, and the force sensor occludes a portion of the object from the optical sensor when the optical sensor generates the visual dataset;
   determining a region of interest (RoI) including a portion of the object that is not occluded by the force sensor when the optical sensor generates the visual dataset;
   generating a visual estimate of the portion of the object in the RoI based on the image data and the depth data, wherein the visual estimate includes an object point cloud;
   generating a tactile estimate of the object based on the tactile data, wherein the tactile estimate includes a surface point cloud; and
   estimating a pose of the object based on the visual estimate and the tactile estimate by fusing the object point cloud and the surface point cloud in a 3D space, wherein the pose is a six-dimensional pose.

12. The computer implemented method of claim 11, further comprising:
   performing semantic object segmentation on the image data to segment the portion of the object in the RoI;

masking the depth data using the semantic object segmentation; and converting the masked depth data into the object point cloud.

13. The computer implemented method of claim 9, wherein the image data is RGB data from the optical sensor and wherein the depth data is received from a ranging sensor.

14. The computer implemented method of claim 11, wherein the pose includes a location and an orientation of the object in the 3D space.

15. The computer implemented method of claim 11, wherein the visual estimate includes the model of the portion of the object included in the RoI and the tactile estimate includes a model of the portion of the object occluded by the force sensor when the optical sensor generates the visual dataset.

16. A non-transitory computer readable storage medium storing instructions that when executed by a computer having a processor to perform a method for visuo-tactile object pose estimation, the method comprising:

receiving image data about an object in an environment, wherein the image data includes a visualized dataset of a portion of the object generated by an optical sensor;

receiving depth data about the object;

receiving tactile data about the object, wherein the tactile data includes a tactile dataset generated by a force sensor, and the force sensor occludes a portion of the object from the optical sensor when the optical sensor generates the visual dataset;

determining a region of interest (RoI) including a portion of the object that is not occluded by the force sensor when the optical sensor generates the visual dataset;

generating a visual estimate of the portion of the object in the RoI based on the image data and the depth data, wherein the visual estimate includes an object point cloud;

generating a tactile estimate of the object based on the tactile data, wherein the tactile estimate includes a surface point cloud; and estimating a pose of the object based on the visual estimate and the tactile estimate by fusing the object point cloud and the surface point cloud in a 3D space, wherein the pose is a six-dimensional pose including a location and an orientation of the object in the 3D space.

17. The non-transitory computer readable storage medium of claim 16, further comprising:

performing semantic object segmentation on the image data to segment the portion of the object in the RoI;

masking the depth data using the semantic object segmentation; and converting the masked depth data into the object point cloud.

18. The non-transitory computer readable storage medium of claim 16, wherein the image data is RGB data from the optical sensor and wherein the depth data is received from a ranging sensor.

19. The non-transitory computer readable storage medium of claim 16, wherein the visual estimate includes a model of the portion of the object included in the RoI and the tactile estimate includes a model of the portion of the object occluded by the force sensor when the optical sensor generates the visual dataset.

20. The non-transitory computer readable storage medium of claim 16, wherein the pose includes a location and an orientation of the object in the 3D space.

* * * * *